(12) United States Patent
Park et al.

(10) Patent No.: US 12,248,239 B2
(45) Date of Patent: Mar. 11, 2025

(54) CAMERA MODULE

(71) Applicant: SAMSUNG ELECTRO-MECHANICS CO., LTD., Suwon-si (KR)

(72) Inventors: Jae Man Park, Suwon-si (KR); Sang Hun Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 661 days.

(21) Appl. No.: 17/545,177

(22) Filed: Dec. 8, 2021

(65) Prior Publication Data

US 2023/0077193 A1 Mar. 9, 2023

(30) Foreign Application Priority Data

Sep. 7, 2021 (KR) .......................... 10-2021-0119249

(51) Int. Cl.
  *G03B 5/00* (2021.01)
  *G03B 17/12* (2021.01)
  *H04N 23/51* (2023.01)
  *H04N 23/68* (2023.01)

(52) U.S. Cl.
  CPC .............. *G03B 5/00* (2013.01); *G03B 17/12* (2013.01); *H04N 23/51* (2023.01); *H04N 23/682* (2023.01); *G03B 2205/0069* (2013.01)

(58) Field of Classification Search
  CPC .... H04N 23/51; H04N 23/682; H04N 23/685; H04N 23/57; G03B 5/00; G03B 17/12; G03B 2205/0069; G03B 2205/0015; G03B 3/10; G03B 30/00
  See application file for complete search history.

(56) References Cited

U.S. PATENT DOCUMENTS

| | | | |
|---|---|---|---|
| 10,715,730 B1 * | 7/2020 | Xu | H04N 23/55 |
| 2007/0029149 A1 * | 2/2007 | Ohki | F16F 13/10 |
| | | | 267/136 |
| 2011/0236008 A1 * | 9/2011 | Kang | G03B 3/10 |
| | | | 396/133 |
| 2014/0098421 A1 * | 4/2014 | Umezu | G02B 27/646 |
| | | | 359/554 |
| 2018/0115689 A1 * | 4/2018 | Lin | G02B 7/09 |
| 2020/0036301 A1 * | 1/2020 | Wu | H02K 41/0356 |
| 2020/0096782 A1 * | 3/2020 | Miller | H04N 23/51 |

(Continued)

FOREIGN PATENT DOCUMENTS

| | | |
|---|---|---|
| JP | 2016-206531 A | 12/2016 |
| KR | 10-2015-0089648 A | 8/2015 |

(Continued)

*Primary Examiner* — Twyler L Haskins
*Assistant Examiner* — John H Morehead, III
(74) *Attorney, Agent, or Firm* — NSIP Law

(57) ABSTRACT

A camera module includes: a housing; a first dynamic component movably disposed in the housing in a direction of an optical axis; a second dynamic component including a lens and movably disposed on the first dynamic component in a direction orthogonal to the optical axis; a pocket configured in either one or both of the first dynamic component and the second dynamic component; a damping gel disposed in the pocket; and a damping pin extending from the first moving body or the second moving body, and at least partially embedded in the damping gel.

21 Claims, 11 Drawing Sheets

(56) References Cited

U.S. PATENT DOCUMENTS

| | | | |
|---|---|---|---|
| 2021/0302690 A1* | 9/2021 | Lin | G02B 7/09 |
| 2022/0272237 A1* | 8/2022 | Rho | H04N 23/51 |
| 2023/0185162 A1* | 6/2023 | Lee | G03B 3/10 |

FOREIGN PATENT DOCUMENTS

| | | |
|---|---|---|
| KR | 10-2016-0148281 A | 12/2016 |
| KR | 10-2021-0009495 A | 1/2021 |

\* cited by examiner

CAMERA MODULE

CROSS-REFERENCE TO RELATED APPLICATIONS

This application claims the benefit under 35 U.S.C. § 119(a) of Korean Patent Application No. 10-2021-0119249 filed on Sep. 7, 2021 in the Korean Intellectual Property Office, the entire disclosure of which is incorporated herein by reference for all purposes.

BACKGROUND

1. Field

This disclosure relates to a camera module. More specifically, for example, this disclosure relates to optical image stabilization of a camera module accommodated in a mobile device.

2. Description of Related Art

A camera employed in a mobile device such as a smartphone or a tablet may provide an optical image stabilization (OIS) function. Through the OIS function, the camera may compensate for shaking of the mobile device by moving a lens or a sensor of a camera, thereby providing a clear image.

A lens or an image sensor may be tilted, linearly moved, or rotated by an image sensor according to OIS driving. However, when a camera is exposed to external disturbances such as external impacts during driving of the camera, the lens may not be smoothly driven, such that OIS quality may be deteriorated. Accordingly, it is desirable to develop technology that provides high-quality OIS even when a camera is exposed to external disturbances.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a first dynamic component movably disposed in the housing in a direction of an optical axis; a second dynamic component including a lens and movably disposed on the first dynamic component in a direction orthogonal to the optical axis; a pocket configured in either one or both of the first dynamic component and the second dynamic component; a damping gel disposed in the pocket; and a damping pin extending from the first moving body or the second moving body, and at least partially embedded in the damping gel.

The pocket may be defined by one or more surfaces of the first dynamic component, and the damping pin may extend from the second dynamic component such that the damping pin is at least partially embedded in the damping gel.

The second dynamic component may include an injection body and an insert member at least partially embedded in the injection body, and the damping pin may extend from the insert member toward the pocket.

The pocket may be defined by one or more surfaces of the second dynamic component, and the damping pin may extend from the first dynamic component and may be at least partially embedded in the damping gel.

The first dynamic component may include a carrier configured to accommodate the second dynamic component, and a cover disposed over the second dynamic component and configured to prevent the second dynamic component from being separated from the carrier.

The camera module may further include a damper coupled to the cover and having a portion protruding to a region above the cover. The damping pin may extend from the damper to the pocket.

The cover may define an incident hole corresponding to an optical axis, and the damping pin may be configured to extend from an edge surrounding the incident hole of the cover to the pocket.

The camera module may further include: a driving assembly configured to move the first dynamic component in the direction of the optical axis with respect to the housing.

The driving assembly may include: a magnet coupled to one of the first dynamic component and the housing; and a coil coupled to the other of the first dynamic component and the housing.

The driving assembly may include a ball member disposed between the first dynamic component and the housing.

The camera module may further include: a driving assembly configured to move the second dynamic component in the direction orthogonal to the optical axis with respect to the first dynamic component.

The driving assembly may include: a magnet coupled to one of the second dynamic component and the housing; and a coil coupled to the other of the second dynamic component and the housing.

The driving assembly may include a ball guide disposed between the first dynamic component and the second dynamic component, a ball member disposed between the ball guide and the first dynamic component, and another ball member disposed between the ball guide and the first dynamic component.

The ball guide may be configured in a form of a quadrangular frame, and may include a cut portion recessed inwardly from an outer edge of the ball guide and accommodating at least a portion of the damping pin.

The ball guide may be configured in an L-shape such that the ball guide allows a portion of the second dynamic component to directly oppose the first dynamic component in the direction of the optical axis. The damping pin or the pocket may be formed in the portion of the second dynamic component.

The damping gel may include a viscoelastic material.

In another general aspect, a camera module includes: a housing; a lens barrel disposed in the housing and including a lens; a lens holder disposed in the housing and fixed to the lens barrel; a carrier disposed in the housing and accommodating the lens holder; a ball guide disposed between the carrier and the lens holder in an optical axis direction; a damping gel disposed in a pocket of the carrier; and a damper mounted in the lens holder and extending into the damping gel. The carrier is configured to move together with the lens holder in the optical axis direction, with respect to the housing. The lens holder is configured to move in a direction orthogonal to the optical axis direction, with respect to the housing.

The camera damper may include a pin immersed in the damping gel.

In another general aspect, a camera module includes: a housing; a lens barrel disposed in the housing and including a lens; a lens holder disposed in the housing and fixed to the lens barrel; a carrier disposed in the housing and accommodating the lens holder; a ball guide disposed between the carrier and the lens holder in an optical axis direction; a cover coupled to the carrier and disposed over the lens holder; a damping gel disposed in a pocket of the lens holder; and a damper mounted on the cover and extending into the damping gel. The carrier is configured to move together with the lens holder in the optical axis direction, with respect to the housing. The lens holder is configured to move in a direction orthogonal to the optical axis direction, with respect to the housing.

The ball guide may include a quadrangular frame having a cut portion recessed inwardly from an outer edge of the quadrangular frame and accommodating at least a portion of the damper.

The damper may include a pin immersed in the damping gel.

The damper may not interfere with the ball guide.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
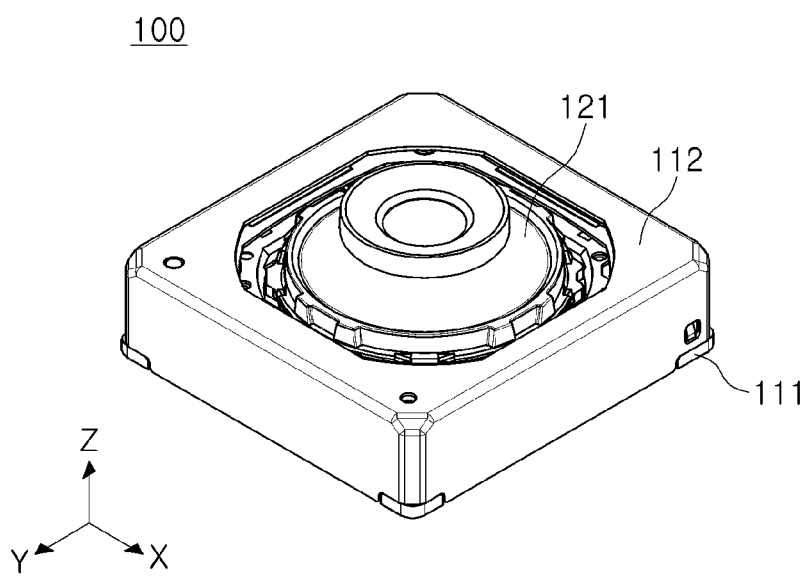
FIG. 1 is a perspective diagram illustrating a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

In the example embodiments, the X-direction, the Y-direction, and the Z-direction may refer to a direction parallel to the X-axis, a direction parallel to the Y-axis, and a direction parallel to the Z-axis, respectively, illustrated in the drawings. Also, the X-direction may include both the +X-axis direction and the −X-axis direction, which may also be applied to the Y-direction and the Z-direction, unless otherwise indicated.

In example embodiments, a description of two directions (or axes) being parallel to or orthogonal to each other may also include examples in which the two directions (or axes) are substantially parallel or substantially orthogonal to each other. For example, a description of a first axis and a second axis being orthogonal to each other may indicate that the first axis and the second axis may form an angle of 90 degrees or an angle close to 90 degrees.

The following description includes various references to "optical axis direction," "direction parallel to the optical axis direction, "along an optical axis," and the like. IT is too be understood that such references describe a direction corresponding to a direction in which an optical axis extends.

Paragraphs beginning with "in an embodiment," or the like, do not necessarily refer to the same example embodiments. The particular features, structures, or characteristics may be combined in any suitable manner consistent with the present disclosure.

In example embodiments described herein, "configured to" indicates that a component includes a structure necessary to implement a certain function.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
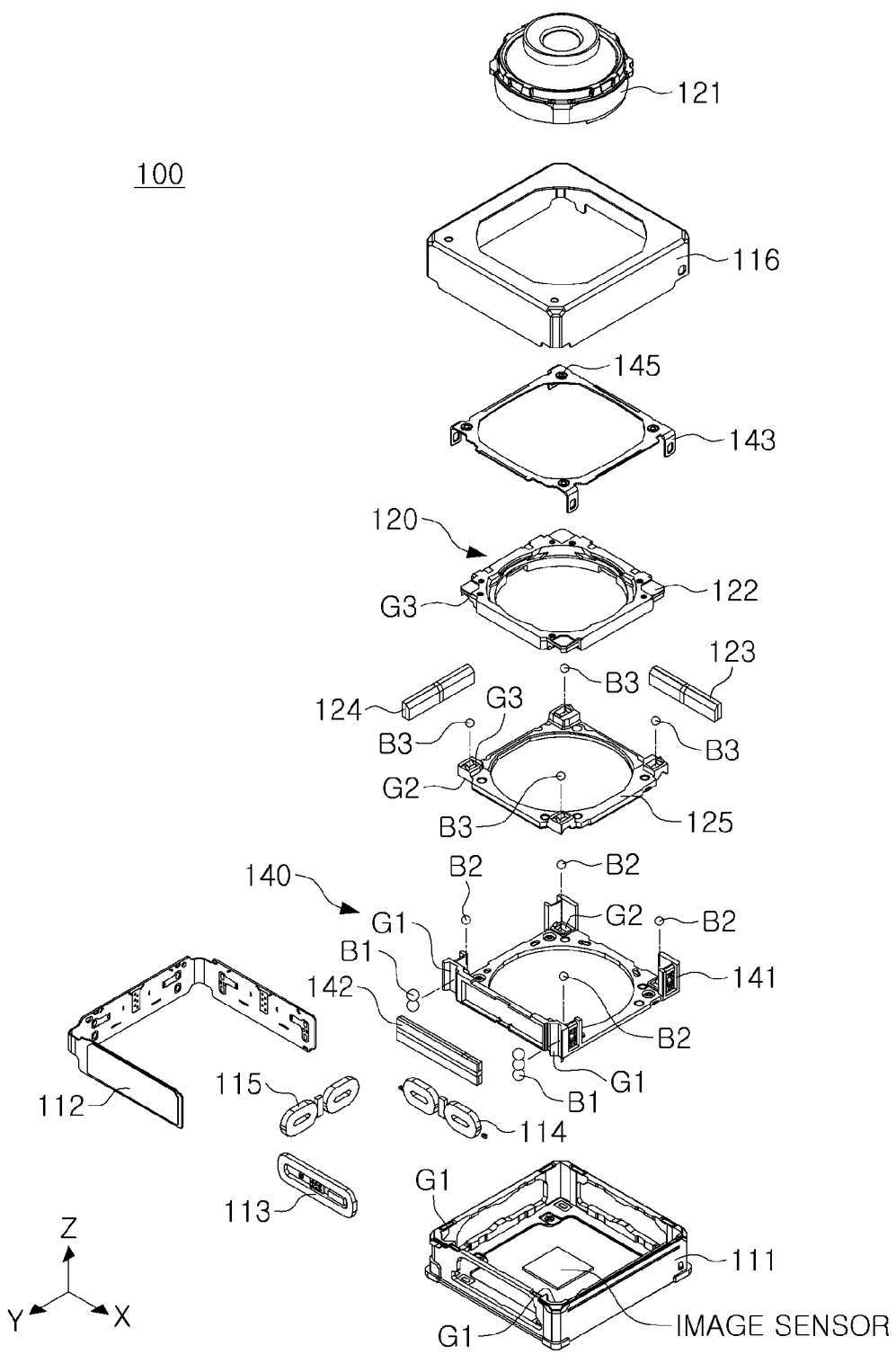
FIG. 2 is an exploded perspective diagram illustrating the camera module of FIG. 1, according to an embodiment.

FIG. 1 is a perspective diagram illustrating a camera module 100, according to an embodiment. FIG. 2 is an exploded perspective diagram illustrating the camera module 100, according to an embodiment.

Referring to FIGS. 1 and 2, the camera module 100 may include, for example, a housing 111, a lens barrel 121 accommodated in the housing 111 and including a lens, and an image sensor disposed below the lens barrel 121. The lens may include at least one lens element defining an optical axis. In the illustrated embodiment, the optical axis may be parallel to the Z-axis.

In an embodiment, the camera module 100 may provide an autofocusing function or an optical image stabilization function by driving the lens barrel 121. The camera module 100 may include a first driving unit (or first driving assembly) configured to move the lens barrel 121 with respect to the housing 111. For example, the driving unit may move the lens barrel 121 along the optical axis (e.g., in a direction of or parallel to the optical axis) or in a direction orthogonal to the optical axis.

As the lens barrel 121 moves in the direction parallel to the optical axis, a focus may be adjusted. Also, as the lens barrel 121 moves in the direction orthogonal to the optical axis or is tilted with respect to the optical axis, shaking of the camera module 100 may be compensated.

The lens barrel 121 may be accommodated in a carrier 141, and may move in the optical axis direction together with the carrier 141. In an embodiment, the carrier 141 may be configured to be movable in the direction parallel to the optical axis with respect to the housing 111. In an embodiment, the camera module 100 may include a first driving unit that allows the carrier 141 to move in the direction parallel to the optical axis. The first driving unit may include a voice coil motor, for example.

In an embodiment, a first magnet 142 may be mounted on one side of the carrier 141, a first coil 113 opposing the first magnet 142 may be disposed in the housing 111, and the carrier 141 (or the lens barrel 121) may move in the direction parallel to the optical axis with respect to the housing 111 by electromagnetic interaction between the magnet 142 and the first coil 113. The first coil 113 may be attached to a substrate 112 disposed on a side surface of the housing 111. In another embodiment, the first magnet 142 may be mounted on the housing 111, and the first coil 113 may be mounted on the carrier 141.

The first driving unit may include a first guide structure configured to guide the movement of the carrier 141 in the optical axis direction. The first guide structure may include a first ball member B1 and a first guide groove G1 configured to accommodate the first ball member B1. The first guide groove G1 may extend in the direction parallel to the optical axis, and may be configured in each of the carrier 141 and the housing 111. The first magnet 142 may be mounted on one side of the carrier 141, and the first guide groove G1 may be disposed on each of opposing sides of the first magnet 142 in the length direction (the X direction).

The first ball member B1 may move in the direction parallel to the optical axis along the first guide groove G1 disposed in the carrier 141 and the housing 111, and accordingly, the degree of freedom (DOF) of the carrier 141 with respect to the housing 111 may be limited to the direction parallel to the optical axis.

The first ball member B1 may move in a state of being in close contact with the first guide groove G1 formed in the carrier 141 and the housing 111, and this close contact state may be maintained by a pulling magnet and a pulling yoke. For example, a pulling yoke opposing the first magnet 142 may be disposed on one side of the first coil 113, and the first magnet 142 may function as a pulling magnet. The magnetic attraction between the pulling yoke and the pulling magnet may pull the carrier 141 to one side of the housing 111, and, accordingly, the first ball member B1 may be in close contact with the first guide grooves G1 on both sides of the first magnet 142. However, when a plurality of the first ball members B1 are provided, a portion of the first ball members B1 may be in close contact with the first guide groove G1, and an air gap may be present between the other portion of the first ball members B1 and the first guide groove G1.

In an embodiment, the lens barrel 121 may be configured to move in two directions orthogonal to the optical axis with respect to the housing 111. For example, the lens barrel 121 may move in the X-axis or Y-axis direction with respect to the housing 111.

In an example embodiment, the lens barrel 121 may be configured to move in a direction orthogonal to the optical axis with respect to the carrier 141. The movement of the lens barrel 121 in the direction parallel to the optical axis may be provided by the movement of the carrier 141 with respect to the housing 111, and the movement of the lens barrel 121 in the direction orthogonal to the optical axis may be provided by the movement of the lens barrel 121 with respect to the carrier 141.

In an embodiment, the lens barrel 121 may be fixed and coupled to a lens holder 122. In the illustrated example embodiment, the lens barrel 121 and the lens holder 122 may be formed as separate components, but the disclosure is not limited to this configuration. In an embodiment, the lens barrel 121 and the lens holder 122 may be integrated with each other.

In an embodiment, the camera module 100 may include a second driving unit (or second driving assembly) configured to move the lens barrel 121 (or the lens holder 122) in the direction orthogonal to the optical axis with respect to the carrier 141 (or the housing 111).

In an embodiment, the second driving unit may include a second magnet 123 and a third magnet 124 fixed and coupled to the lens holder 122. The second driving unit may include a second coil 114 and a third coil 115 opposing the second magnet 123 and the third magnet 124, respectively, and fixed and coupled to the housing 111. The electromagnetic interaction between the second magnet 123 and the second coil 114 or the electromagnetic interaction between the third magnet 124 and the third coil 115 may move the lens barrel 121 in the direction orthogonal to the optical axis with respect to the carrier 141 (or the housing 111). For example, due to the interaction between the second coil 114 and the second magnet 123, the lens holder 122 may move in the X direction or the Y direction within the carrier 141.

The second coil 114 and the third coil 115 may be attached to the substrate 112 disposed on the side surface of the housing 111. In another example embodiment, the second magnet 123 and/or the third magnet 124 may be mounted on the housing 111, and the second coil 114 and/or the third coil 115 may be mounted on the lens holder 122.

In an embodiment, the second driving unit may include a ball guide 125 disposed between the lens holder 122 and the carrier 141. A second ball member B2 may be disposed between the carrier 141 and the ball guide 125, and the third ball member B3 may be disposed between the ball guide 125 and the lens holder 122.

Each of the carrier 141 and the ball guide 125 may include a second guide groove G2 configured to accommodate at least a portion of the second ball member B2. Each of the ball guide 125 and the lens holder 122 may include a third guide groove G3 configured to accommodate at least a portion of the third ball member B3. The second guide groove G2 and the third guide groove G3 may extend in respective directions orthogonal to the optical axis, and may accommodate at least a portion of the second ball member B2 and the third ball member B3, respectively. For example, the second guide groove G2 may extend in the X direction, and the second ball member B2 may move in the X direction along the second guide groove G2. The third guide groove G3 may extend in the Y direction, and the third ball member B3 may move in the Y direction along the third guide groove G3. In this case, the movement of the ball guide 125 with respect to the carrier 141 may be limited to the X direction, and the movement of the lens holder 122 with respect to the ball guide 125 may be limited to the Y direction.

The second ball member B2 and the third ball member B3 may move in a state of being in close contact with the second guide groove G2 or the third guide groove G3, and this close contact state may be maintained by a pulling magnet and a pulling yoke. For example, a pulling yoke may be disposed in a portion opposite to the second magnet 123 or the third magnet 124 in the optical axis direction in the carrier 141, and the second magnet 123 or the third magnet 124 may function as a pulling magnet. The magnetic attraction between the pulling yoke and the pulling magnet may pull the lens holder 122 toward the carrier 141, and accordingly, the second ball member B2 and the third ball member B3 may be in close contact with in the second guide groove G2 and the third guide groove G3, respectively. However, when a plurality of second ball members B2 and a plurality of second guide grooves G2 are provided, or a plurality of third ball members B3 and a plurality of third guide grooves G3 are provided, only a portion of the second ball members B2 or the third ball members B3 may be in close contact with the second guide grooves G2 or the third guide grooves G3, respectively. For another example, when four second ball members B2 are disposed between the ball guide 125 and the carrier 141, three of the four second ball members B2 may be in close contact with three of four second guide grooves G2, and the other second ball member B2 may not be in close contact with the other second guide groove G2. For another example, when four third ball members B3 are disposed between the ball guide 125 and the lens holder 122, the three of the four third ball members B3 may be in close contact with three of four third guide grooves G3, and the other third ball member B3 may not be in close contact with the other third guide groove G3.

In an embodiment, the camera module 100 may include a cover 143 fixed and coupled to the carrier 141. The cover 143 may be configured to prevent the lens holder 122 from being separated from the carrier 141. The cover 143 may be partially disposed on the lens holder 122, and may be configured to at least partially cover the lens holder 122. For example, a portion of the cover 143 may be configured to overlap the lens holder 122 in the optical axis direction. The lens holder 122 may move in the optical axis direction within the carrier 141, but the lens holder 122 may be blocked by the cover 143 and may not be separated from the carrier 141.

In an embodiment, the camera module 100 may include a shield can 116 fixed and coupled to the housing 111. The shield can 116 may cover an upper portion of the housing 111 and may protect the components in the housing 111 (e.g., the carrier 141 and the lens holder 122). The shield can 116 may be configured to prevent or reduce a magnetic field present externally of the camera module 100 from penetrating into the camera module 100. Also, the shield can 116 may prevent a magnetic field generated in the camera module 100 from being discharged from the camera module 100 and affecting other devices, or may reduce the magnetic field affecting other devices.

The carrier 141 may move in the optical axis direction within the housing 111, and the carrier 141 may collide with the shield can 116. A damper 145 may be mounted on the cover 143 to mitigate the impact between the shield can 116 and the carrier 141. The damper 145 may be formed of a material elastically deformed by an external force, and may be deformed when colliding with the shield can 116, thereby absorbing the impact or reducing the impact force. For example, the damper 145 may be formed of a material such as rubber, urethane, or silicone.

In an embodiment, the damper 145 may protrude upwardly (+Z direction) on a portion of the cover 143, and may reduce the impact or noise generated when the carrier 141 moves in the +Z direction and collides with the shield can 116.

Hereinafter, the components moving in the optical axis direction with respect to the housing 111 will be referred to collectively as a first dynamic component 140. The first dynamic component 140 may be either one or both of the carrier 141 and a component (e.g., the cover 143 and the damper 145) fixed and coupled to the carrier 141. For example, the first dynamic component 140 may include the carrier 141, the cover 143 fixed and coupled to the carrier 141, and the damper 145.

The components moving in the direction orthogonal to the optical axis with respect to the carrier 141 may be collectively referred to as a second dynamic component 120. The second dynamic component 120 may be at least either one or both of the lens holder 122 and a component (e.g., the lens barrel 121) fixed and coupled to the lens holder 122. For example, the second dynamic component 120 may include the lens barrel 121 and the lens holder 122 fixed and coupled to the lens barrel 121. That is, the second dynamic component 120 may be configured to move in the direction orthogonal to the optical axis with respect to the first dynamic component 140, and the first dynamic component 140 may be configured to move in the direction parallel to the optical axis with respect to the housing 111.

The OIS function may be implemented as the lens holder 122 moves in the direction orthogonal to the optical axis with respect to the carrier 141. However, the movement of the lens holder 122 may not be smooth due to external disturbance. The external disturbance may originate from the outside of the camera module 100 or may be generated by operation of the second driving unit (the OIS driving unit). To enable the lens holder 122 to move smoothly when an external disturbance occurs, the camera module 100 may include a damper structure (e.g., the damper structure 130 in FIG. 3) configured to alleviate an impact caused by external disturbance.

Figure 3:
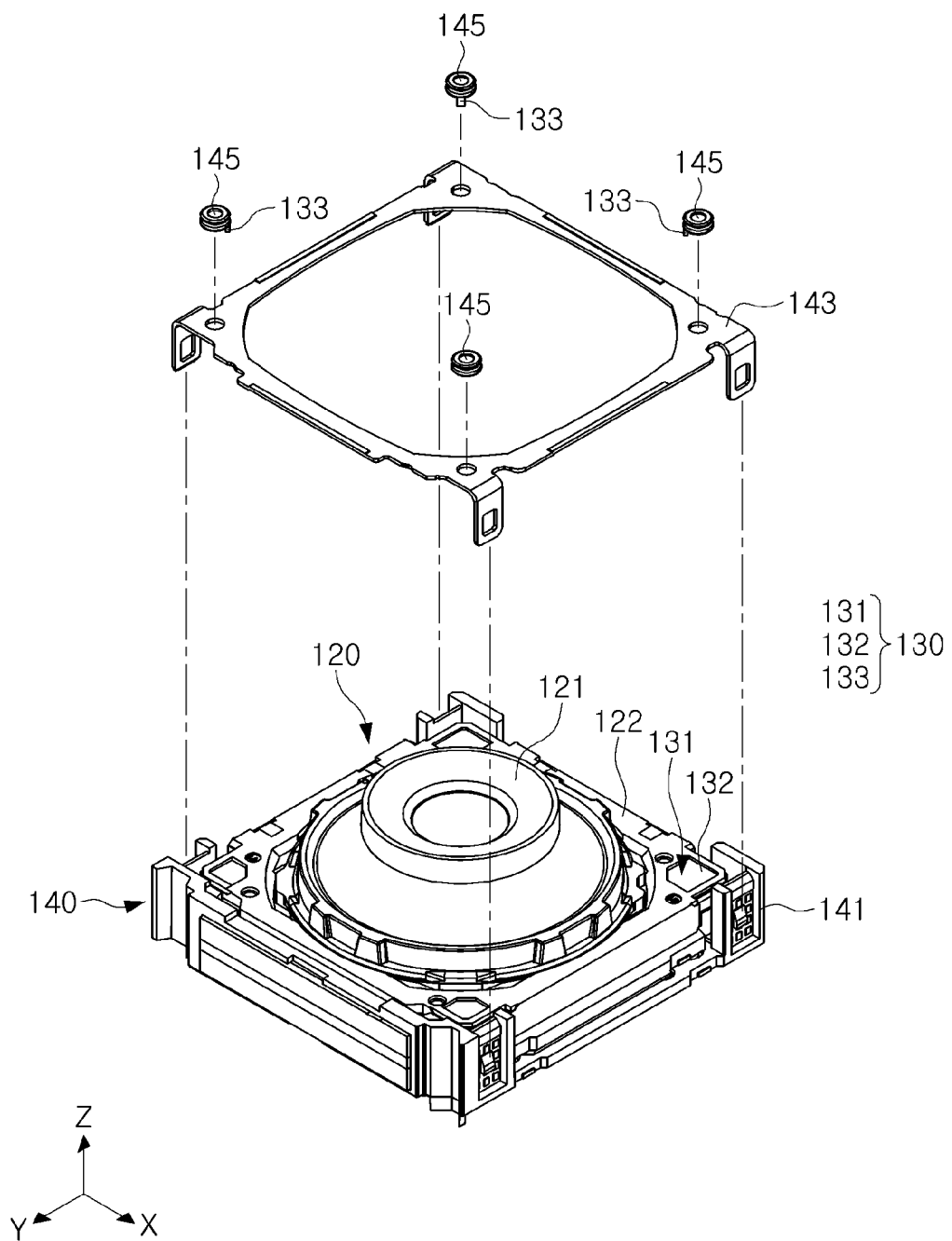
FIG. 3 is a perspective diagram illustrating an example in which a carrier and a cover are separated from the camera module of FIG. 1, according to an embodiment.

The damper structure 130 may include a pocket e.g., the pocket 131 in FIG. 3) filled with damping gel (e.g., the damping gel 132 in FIG. 3) and a damping pin (e.g., the damping pin 133 in FIG. 3) at least partially immersed in the damping gel. The damping gel and the damping pin may damp vibration of the second dynamic component 120 (or the lens holder 122) caused by external disturbance. The damping gel may include a viscoelastic material. The viscoelastic material may be, for example, a gel, grease, or the like.

The pocket may be defined by one or more surfaces of the second dynamic component 120, and the damping pin may extend from the first dynamic component 140 such that the damping pin may be disposed at least partially in the damping gel contained in the pocket. In another embodiment, the pocket may be defined by one or more surfaces of the first dynamic component 140, and the damping pin may extend from the second dynamic component 120 such that the damping pin may be at least partially disposed in the damping gel contained in the pocket.

In an embodiment, the damper structure may include the damping gel disposed in a portion in which the first dynamic component 140 and the second dynamic component 120 oppose each other. For example, the damping gel may be disposed at least partially in the pocket defined by the second dynamic component 120 and/or the first dynamic component 140. For example, the pocket may be formed in the lens holder 122 or the carrier 141.

In an example embodiment, the damper structure may include the damping pin extending from the first dynamic component 140 and/or the second dynamic component 120. For example, the damping pin may be formed on the carrier 141 or the lens holder 122. The damping pin may be integrated with the first dynamic component 140 or the second dynamic component 120, or may be manufactured as a separate component and may be coupled to the first dynamic component 140 or the second dynamic component 120.

When the first dynamic component 140 moves with respect to the second dynamic component 120, the damping pin may be configured to move while being partially immersed in the damping gel. Accordingly, unintentional vibrations of the second dynamic component 120 may be damped while the second dynamic component 120 moves with respect to the first dynamic component 140.

Figure 4:
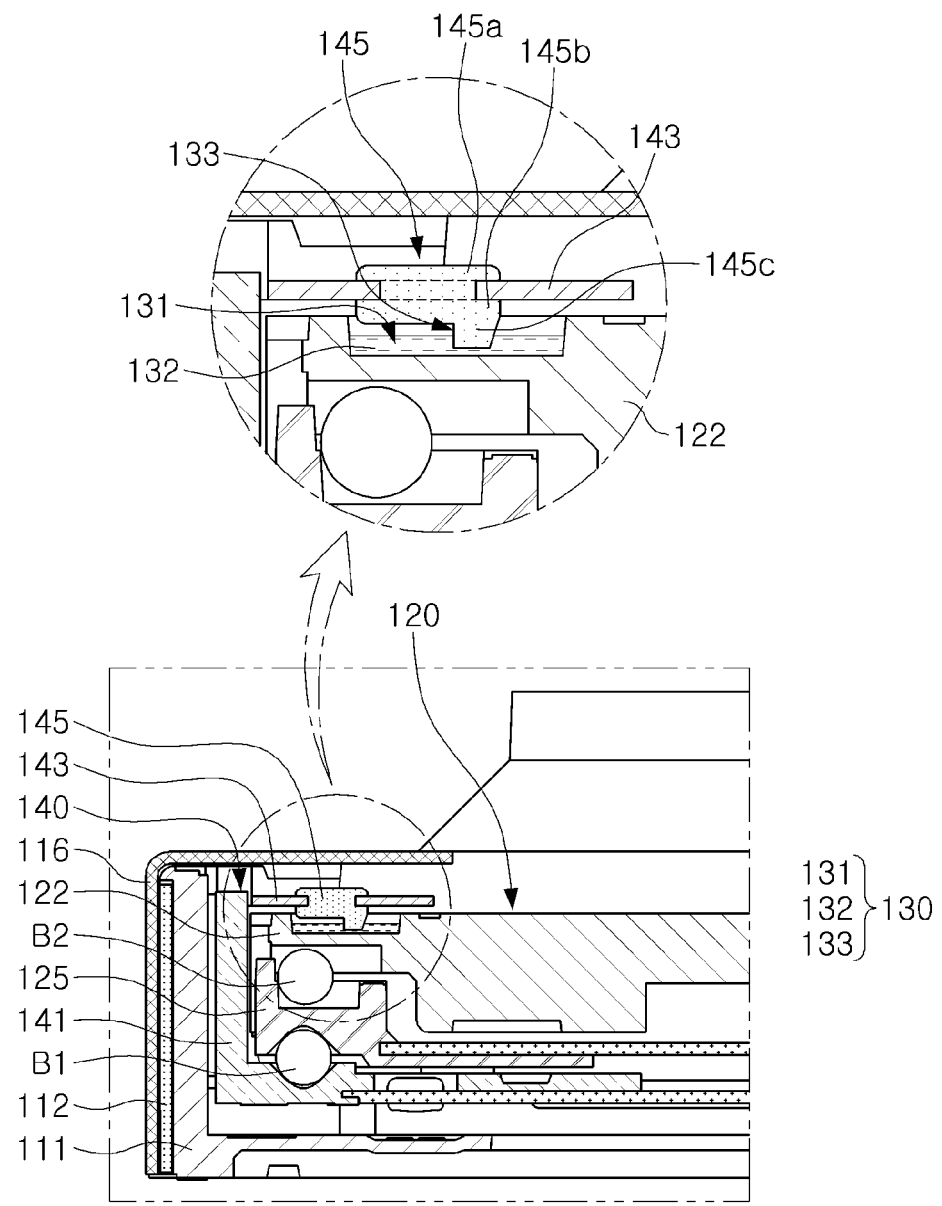
FIG. 4 is a cross-sectional diagram illustrating a damper structure configured in the camera module in FIG. 3, according to an embodiment.

FIG. 3 is a perspective diagram illustrating an example in which a carrier and a cover are separated from a camera module according to an embodiment. FIG. 4 is a cross-sectional diagram illustrating a damper structure 130 configured in the camera module in FIG. 3.

Referring to FIGS. 3 and 4, in an embodiment, the carrier 141 may be coupled to the cover 143, and may include the damper 145 having a portion protruding to a region above the cover 143. The damping pin 133 may be a portion of the damper 145, and may be configured as a protrusion 145c extending to the pocket 131.

In an embodiment, the camera module 100 may include the damper structure 130 disposed between the first dynamic component 140 and the second dynamic component 120. The damper structure 130 may include the pocket 131 filled with the damping gel 132 and the damping pin 133 filled with at least a portion of the damping gel 132.

The pocket 131 may be defined by one or more surfaces of the lens holder 122. In an embodiment, the damping pin 133 may be formed as a portion of the damper 145 mounted on the cover 143. For example, the damper 145 may include an upper portion 145a protruding to a region above the cover 143 (in the +Z direction) and a lower portion 145b protruding to a region below the cover 143 (the −Z direction). At least a portion of the lower portion 145b may be immersed in the damping gel 132 filled in the pocket 131 of the lens holder 122. For example, the lower portion 145b may include a protrusion 145c extending to the pocket 131 formed in the lens holder 122.

The upper portion 145a of the damper 145 may alleviate collisions with the shield can 116 caused by the carrier 141 moving in the optical axis direction with respect to the housing 111. The lower portion 145b of the damper 145 may alleviate collisions with the cover 143 caused by the lens holder 122 (or the second dynamic component 120) moving in the optical axis direction. The protrusion 145c of the lower portion 145b of the damper 145 may provide a damping function for the movement of the lens holder 122 (or the second dynamic component 120) in the direction orthogonal to the optical axis.

Figure 5:
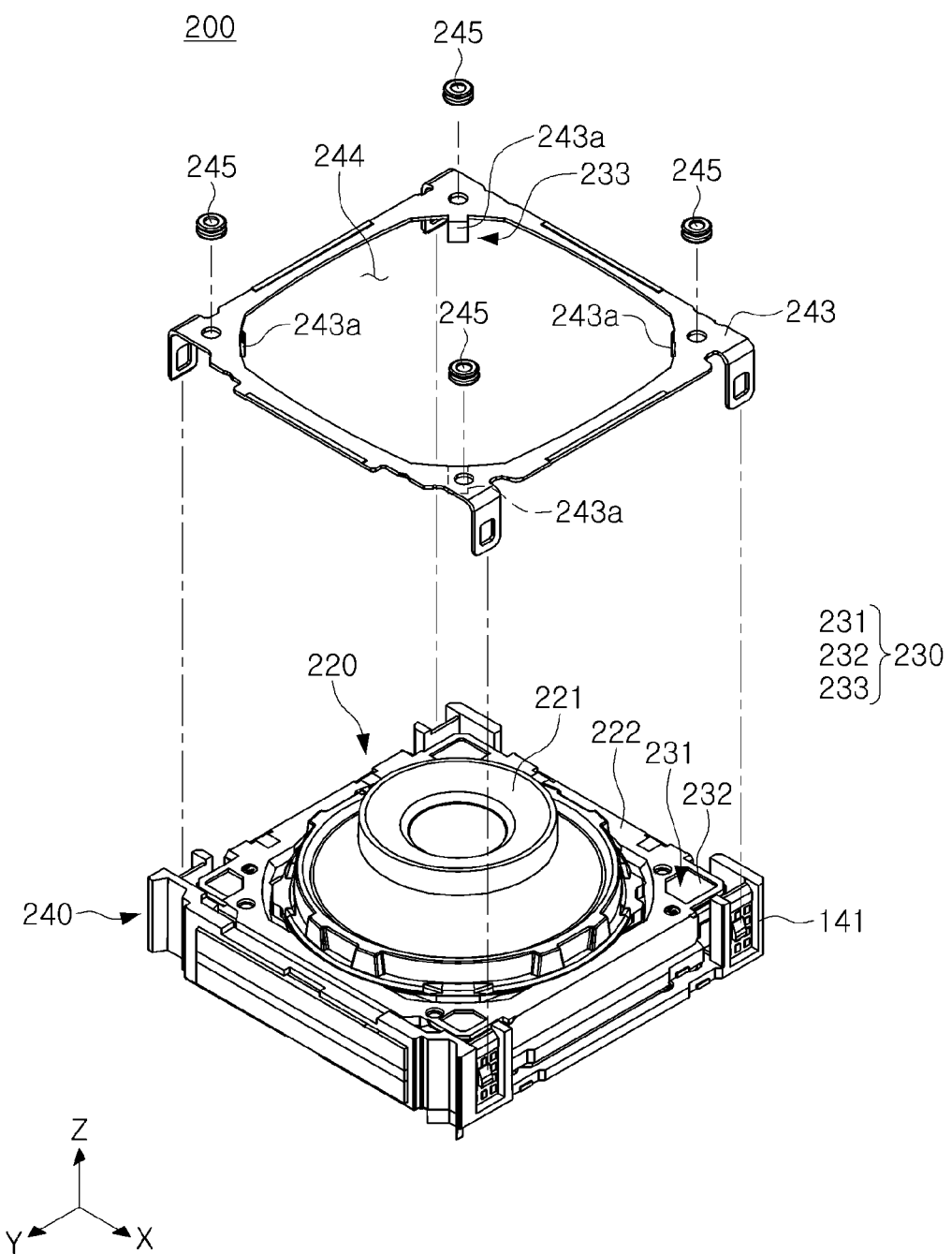
FIG. 5 is a perspective diagram illustrating an example in which a carrier and a cover are separated from a camera module, according to an embodiment.
Figure 6:
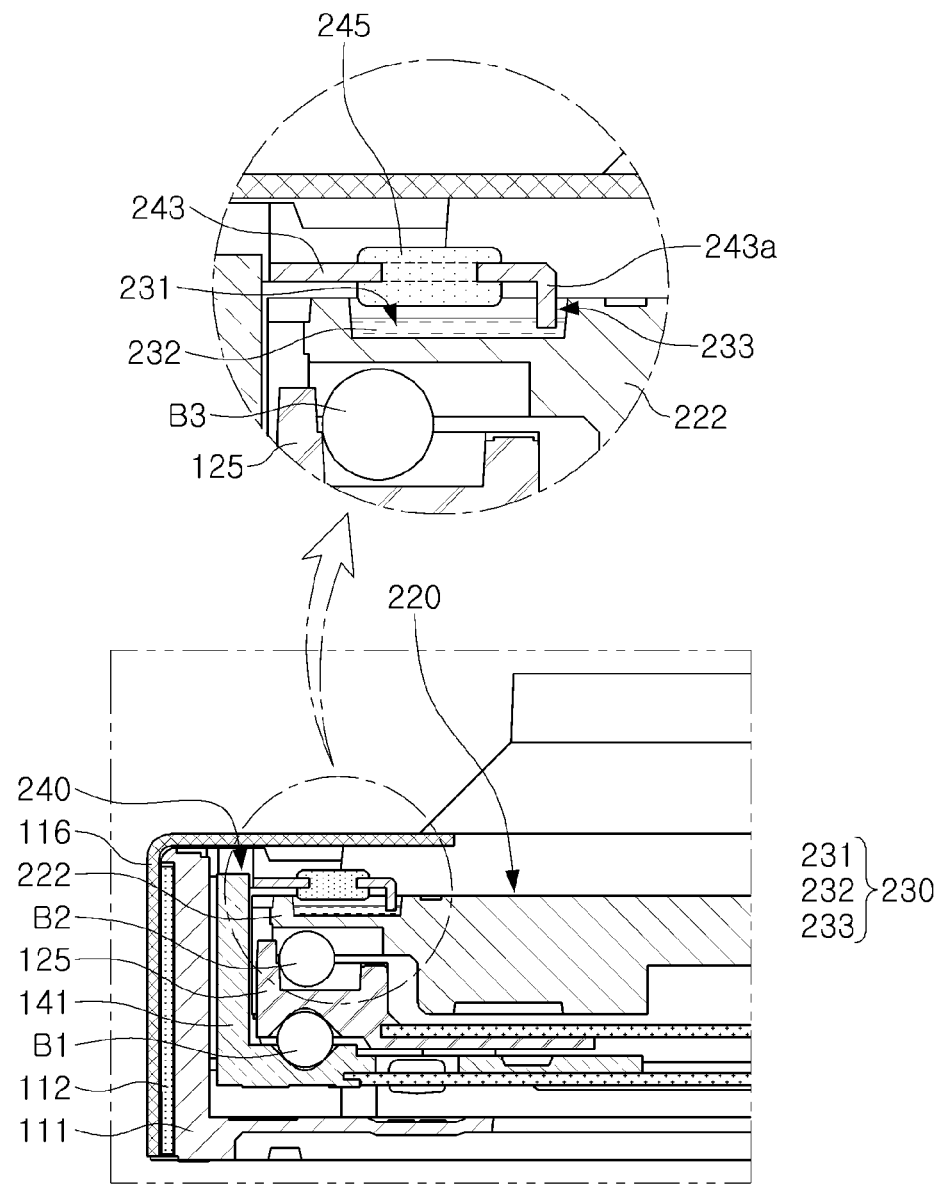
FIG. 6 is a cross-sectional diagram illustrating a damper structure configured in the camera module in FIG. 5, according to an embodiment.
Figure 7:
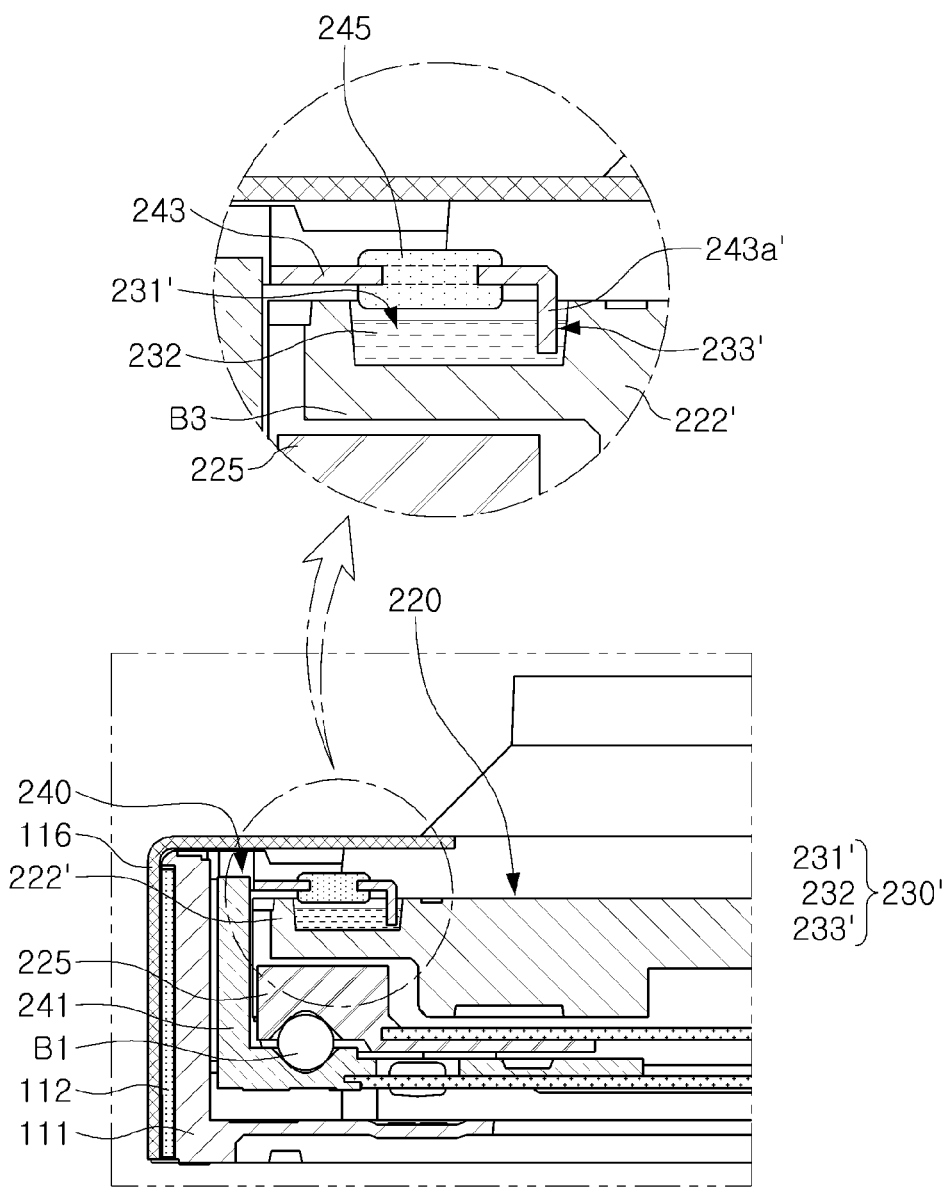
FIG. 7 is a diagram illustrating a damper structure, according to another embodiment.

FIG. 5 is a perspective diagram illustrating an example in which the carrier 141 and a cover 243 are separated from a camera module 200 according to an example embodiment. FIG. 6 is a cross-sectional diagram illustrating a damper structure 230 configured in the camera module 200 of FIG. 5. FIG. 7 is a diagram illustrating a damper structure 230' different from the damper structure 230 in FIG. 6.

In the camera module 200 in FIG. 5, a portion of the components, such as the housing and the shield can, are omitted for ease of description, and the camera module 200 in FIG. 5 may include a portion or all of the components, other than the damper structure 130, described in FIGS. 1 and 2.

In an example embodiment, the camera module 200 may include a damper structure 230 between the first dynamic component 240 and the second dynamic component 220. The damper structure 230 may include a pocket 231 filled with damping gel 232, a damper 245 mounted in the cover 243, and a damping pin 233 at least partially immersed in the damping gel 232. The pocket 231 may be defined by one or more surfaces of a lens holder 222.

In an embodiment, the damping pin 233 may be formed as a portion of the cover 243. The cover 243 may define an incident hole 244 corresponding to the optical axis. For example, the cover 243 may define a circular-shaped incidence hole 244 surrounding an outer circumferential surface of the lens barrel 221. The cover 243 may include an extension portion 243a extending from an edge surrounding the incident hole 244 to the pocket 231. The damping pin 233 may be configured as the extension portion 243a of the cover 243. That is, the extension portion 243a may form the damping pin 233.

In an embodiment, a plurality of the extension portions 243a may be arranged along an edge of the incident hole 244. In the illustrated embodiment, four extension portions 243a may be arranged along the edge of the incident hole 244, but the disclosure is not limited to this example, and in another embodiment, the cover 243 may include one to three, or five or more extension portions 243a, and the number of the pockets 231 formed on the lens holder 222 may correspond to the number of extension portions 243a.

In an embodiment, the lens holder 222 may include the pocket 231 formed on the upper surface of the lens holder 222, and the damping gel 232 filled in the pocket 231, and the cover 243 may include the extension portion 243a extending to the pocket 231. When the lens holder 222 moves with respect to the carrier 241, the extended portion 243a of the cover 243 may move in the internal space of the pocket 231 while being at least partially disposed in the damping gel 232, and the interaction between the extension portion 243a of the cover 243 and the damping gel 232 of the pocket 231 may damp or eliminate the vibration caused by external disturbance.

When the pocket 231 has a low depth (or is not sufficiently deep), the damping pin 233 may not be sufficiently immersed in the damping gel 232, and may not perform the damping function or the damping gel 232 may be separated from the pocket 231 by impact. Thus, referring to FIG. 7, in an embodiment, a damper structure 230' of a camera module may include a pocket 231' having a relatively large depth. The third guide groove G3 may not be formed in a lens holder 222', such that the pocket 231' may have a sufficiently large depth. A damping pin 233' (or an extension portion 243a' of a cover 243') may be further immersed in the pocket 231' (or the damping gel 232). Referring back to FIG. 2, four third ball members B3 may be disposed below the lens holder 222 to correspond to four corners of the lens holder 222. However, in the embodiment of FIG. 7, the third ball member B3 may be disposed in only three corners among the four corners of the lens holder 222'. Accordingly, a portion of the third guide groove G3 may not be formed in the lens holder 222' and a ball guide 225 of FIG. 7, and, thus, the lens holder 222' may include the pocket 231' having a relatively large depth.

Figure 8:
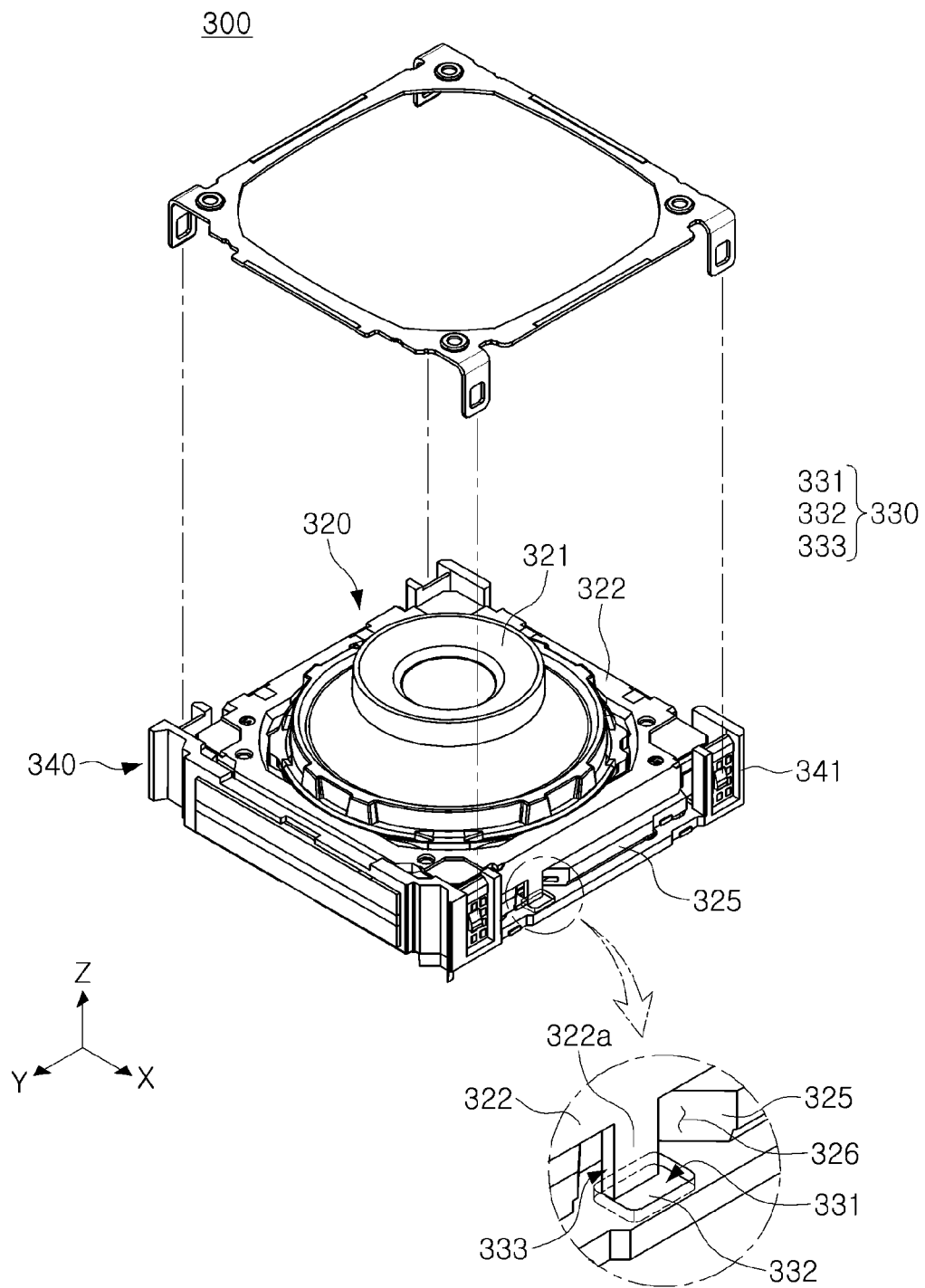
FIG. 8 is a diagram illustrating a carrier of a camera module, according to another embodiment.
Figure 9:
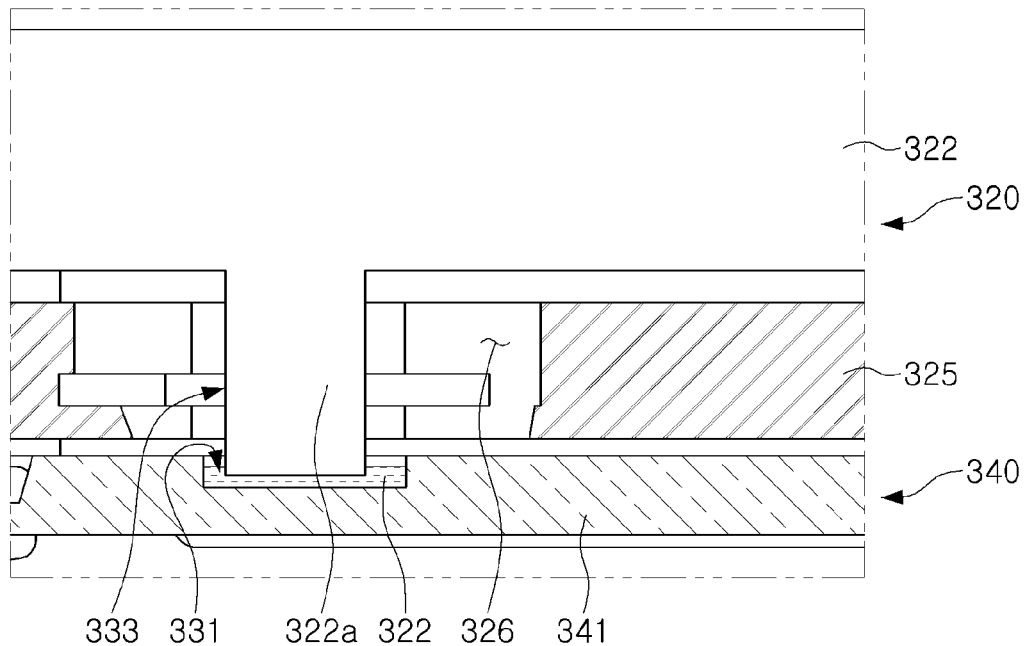
FIG. 9 is a cross-sectional diagram illustrating a damper structure configured in the camera module in FIG. 8, according to an embodiment.
Figure 10:
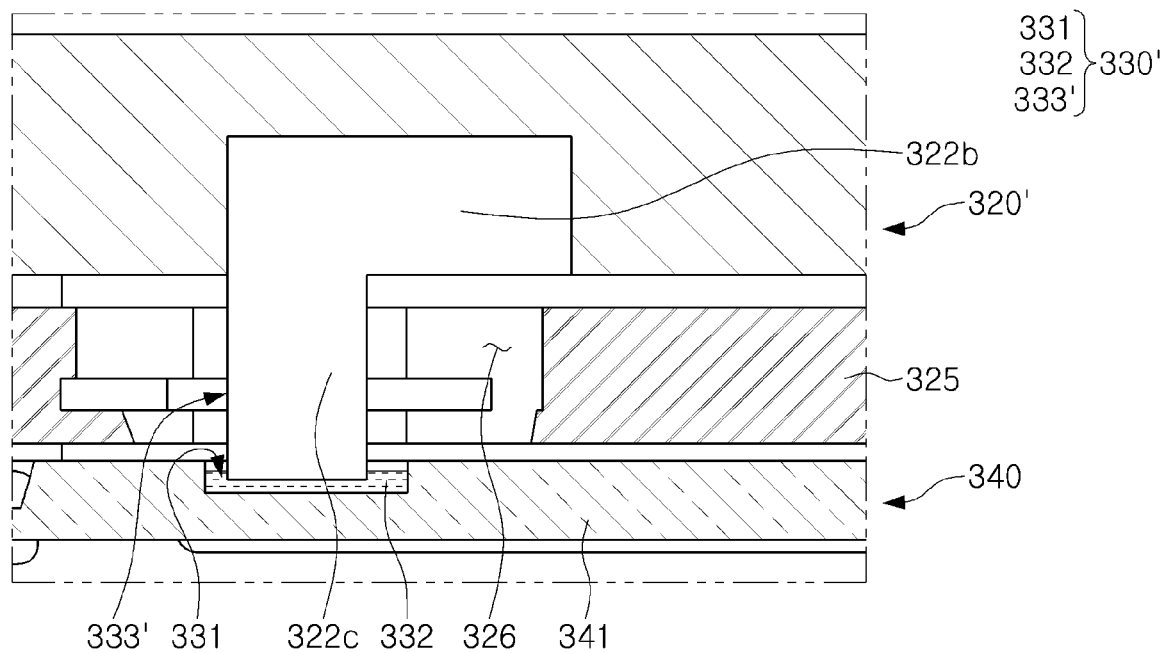
FIG. 10 is a diagram illustrating a damper structure, according to another embodiment.

FIG. 8 is a diagram illustrating a carrier 341 of a camera module 300, according to an embodiment. FIG. 9 is a cross-sectional diagram illustrating a damper structure 330 configured in the camera module 300 of FIG. 8. FIG. 10 is a diagram illustrating a damper structure 330' different from the damper structure 330 in FIG. 9.

In the camera module 300 in FIG. 8, a portion of the components, such as the housing and the shield can are omitted for ease of description, and the camera module 300 in FIG. 8 may include a portion or all of the components, other than the damper structure 130, described in FIGS. 1 and 2.

Referring to FIGS. 8 and 9, in an embodiment, the damper structure 330 may be disposed between a lens holder 322 and a carrier 341. For example, a damping pin 333 may extend from the lens holder 322, and the carrier 341 may include a pocket 331 filled with damping gel 332. The damping pin 333 may be configured to be at least partially immersed in the damping gel 332. As another example, the damping pin 333 may extend from the carrier 341, and the lens holder 322 may include a pocket 331 filled with the damping gel 332. In the description below, the damping pin 333 may extend from the lens holder 322, and the pocket 331 filled with the damping gel 332 may be formed in the carrier 341, but the disclosure is not limited to this example. The damping pin 333 and the damping gel 332 may be formed in the carrier 341 and the lens holder 322, respectively, in an embodiment.

In an embodiment, the damping pin 333 may be formed as a portion of the lens holder 322. For example, the lens holder 322 may include a portion 322a extending toward the pocket 331, and the portion 322a may form the damping pin 333.

In an embodiment, the pocket 331 may be defined by one or more surfaces of a first dynamic component 340, and the damping pin 333 may extend from a second dynamic component 320 such that the damping pin 333 may be at least partially disposed in the damping gel 332 contained in the pocket 331. In another embodiment, the pocket 331 may be defined by one or more surfaces of the second dynamic component 320, and the damping pin 333 may extend from the first dynamic component 340 such that the damping pin 333 is at least partially disposed in the damping gel 332 contained in the pocket 331.

In an embodiment, a ball guide 325 may be configured to not interfere with the damping pin 333. For example, the ball guide 325 may have the form of a quadrangular frame, and may include a cut portion 326 recessed inwardly from an outer edge of the ball guide 325 and configured to accommodate at least a portion of the damping pin 333. The cut portion 326 may be defined by one or more surfaces of the ball guide 325. A portion of the outer edge of the ball guide 325 may be recessed inwardly and may form a space in which the damping pin 333 may move without interference with the ball guide 325.

In an embodiment, damping pin 333 may be integrated with the second dynamic component 320 or the first dynamic component 340, or may be manufactured as a separate component, and may be coupled to the second dynamic component 320 or the first dynamic component 340.

Referring to FIG. 10, in an embodiment, a second dynamic component 320' may include an injection body 322b and an insert member 322c at least partially embedded in the injection body 322b, and a portion of the insert member 322b may extend toward the pocket 331 formed in the first dynamic component 340 and may form a damping pin 333'. In another embodiment, the first dynamic component 340 may include an injection body and an insert member at least partially embedded in the injection body, and a portion of the insert member may extend toward the pocket formed in the second dynamic component and may form a damping pin.

For example, as illustrated in FIG. 10, the second dynamic component 320' may be configured as the lens holder 322, the lens holder 322 may include the plastic injection body 322b, and the insert member 322c formed of a metal material may be included in the injection body 322b. A portion of the insert member 322c may extend to the pocket 331 formed in the carrier 341 and may be at least partially immersed in the damping gel 332 disposed in the pocket 331, and may form the damping pin 333'.

For another example, the first dynamic component 340 may be configured as the carrier 341, the carrier 341 may be a plastic injection body, and an insert member formed of a metal material may be included in the injection body. A portion of the insert member may extend to the pocket 331 formed in the lens holder 322, and may be at least partially immersed in the damping gel 332 disposed in the pocket 331, and may form the damping pin 333'.

Figure 11:
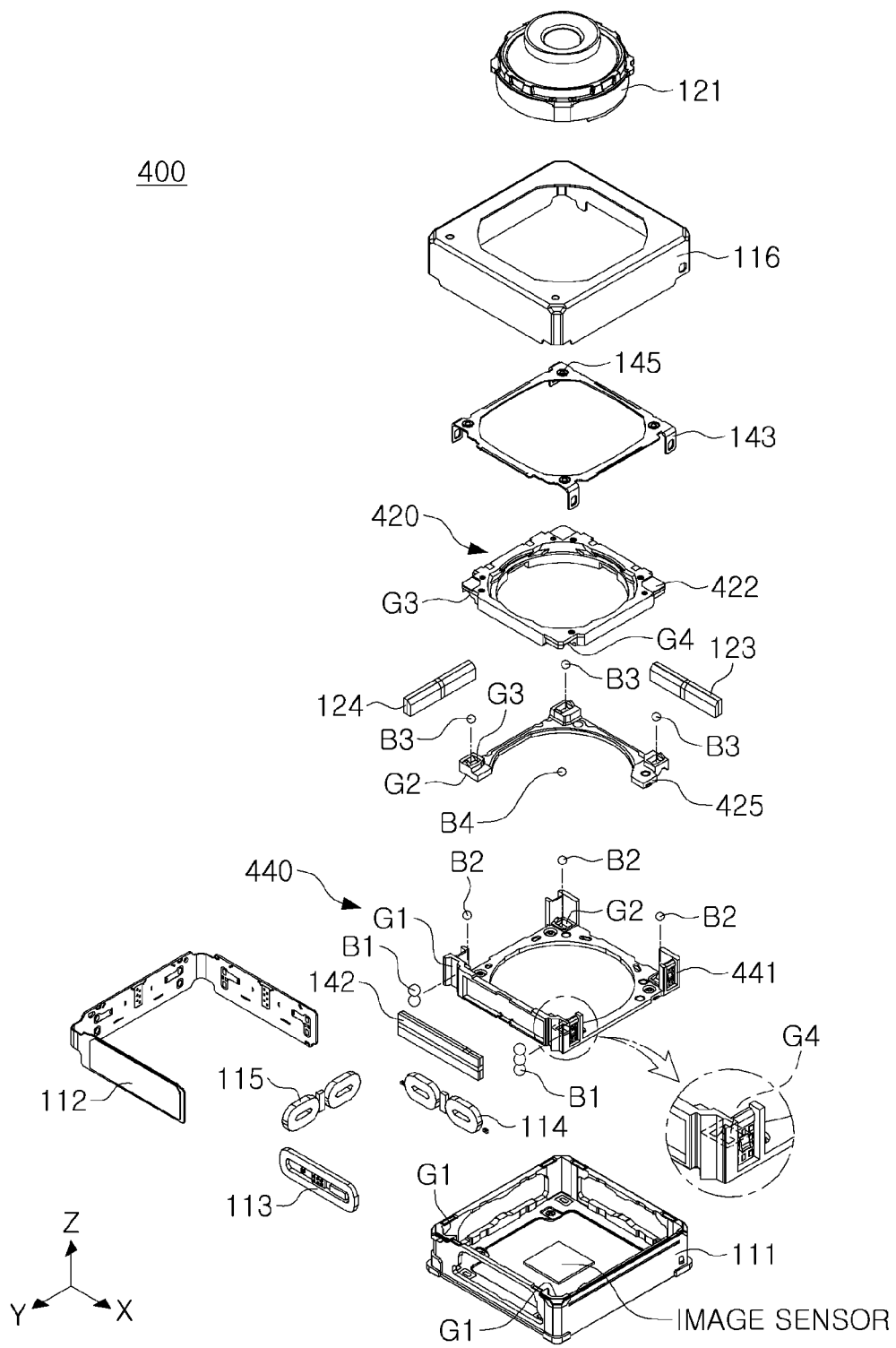
FIG. 11 is an exploded perspective diagram illustrating a camera module, according to another embodiment.
Figure 12:
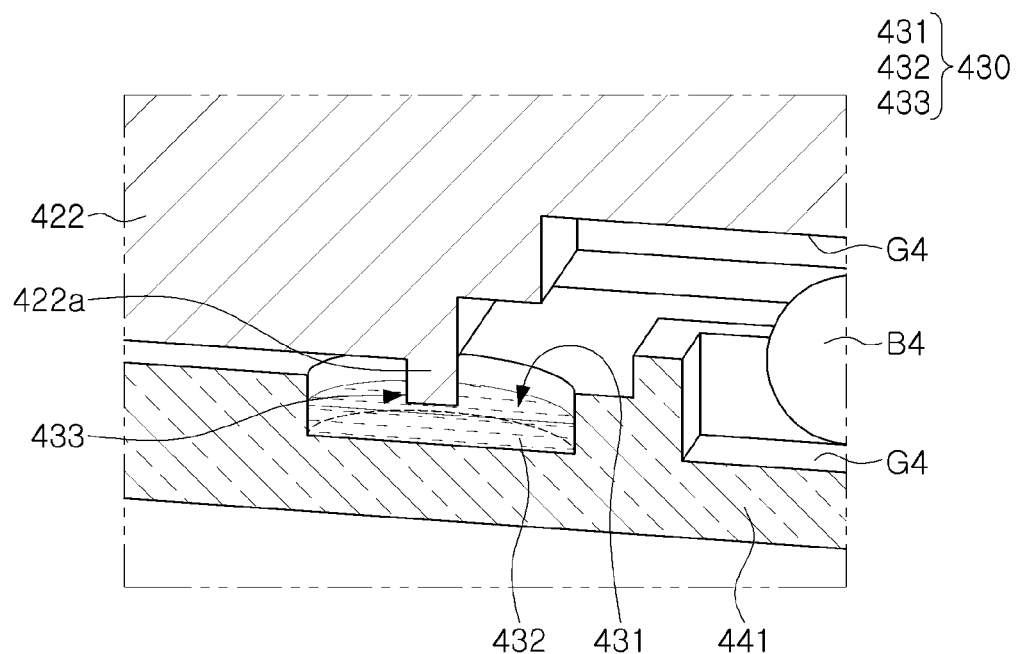
FIG. 12 is a diagram illustrating a damper structure in the camera module in FIG. 11, according to an embodiment.

FIG. 11 is an exploded perspective diagram illustrating a camera module 400, according to an embodiment. FIG. 12 is a diagram illustrating a damper structure 430 in the camera module 400 of FIG. 11.

The camera module 400 may include a ball guide 425 configured differently from the ball guide 125 of the camera module 100 in FIG. 2. Other components included in the camera module 400 in FIG. 11 may be the same as or similar to the components described with reference to FIGS. 1 to 9, unless otherwise indicated.

Referring to FIGS. 11 and 12, in an embodiment, a damper structure 430 may be disposed between a lens holder 422 and a carrier 441. For example, a damping pin 433 may extend from the lens holder 422, and the carrier 441 may include a pocket 431 filled with damping gel 432. The damping pin 433 may be at least partially immersed in the damping gel 432. In an embodiment, the damping pin 433 may be formed as a portion of the lens holder 422. For example, the lens holder 422 may include a portion 422a extending toward the pocket 431, and the portion 422a may form the damping pin 433.

In an embodiment, the ball guide 425 may be formed in an L-shape (or a ¬-shape). For example, the ball guide 425 may have a shape in which two adjacent sides are removed from a quadrangular frame shape. Alternatively, the ball guide 425 may have a shape in which a single corner is removed from a quadrangular frame shape. Differently from the ball guide 125 having a quadrangular frame shape, three second ball members B2 and three third ball members B3 may be disposed above and below the L-shaped ball guide 425, respectively. For example, three second ball members B2 may be disposed between the L-shaped ball guide 425 and the carrier 441, and three third ball members B2 may be disposed between the L-shaped ball guide 425 and the lens holder 422. The second ball member B2 or the third ball member B3 may be disposed in positions corresponding to three corners among of the four corners of the lens holder 422.

The other corner among the four corners of the lens holder 422 may be supported by a fourth ball member B4. The fourth ball member B4 may be accommodated in a fourth guide groove G4 disposed in each of the lens holder 422 and the carrier 441. The fourth ball member B4 may be in contact with each of the carrier 441 and the lens holder 422. The fourth ball member B4 and the carrier 441 (or the lens holder 422) may not be completely in contact with each other, and an air gap may be present therebetween.

In an embodiment, the damping pin 433 and the pocket 431 may be formed in a portion of the lens holder 422 or the carrier 441 that does not overlap with the L-shaped ball guide 425 in the optical axis direction. For example, the damping pin 433 and the pocket 431 may be disposed adjacent to the fourth ball member B4. In an embodiment, the ball guide 425 may be configured to have an L-shape such that a portion of the second dynamic component 420 may directly oppose the first dynamic component 440 in the optical axis direction, and the damping pin 433 or the pocket 431 may be formed in a portion directly opposing the first dynamic component 440 in the optical axis direction. In an embodiment, the ball guide 425 may be configured to allow a portion of the first dynamic component 440 to directly oppose the second dynamic component 420 in the optical axis direction, and the damping pin 433 or the pocket 431 may be formed in a portion of the first dynamic component 440 in which the pocket 431 directly opposes the second dynamic component 420 in the optical axis direction.

The damping pin 433 described in FIGS. 11 and 12 may have the form of an insert member, as shown in FIG. 10.

In embodiments, the camera modules 100, 200, 300, and 400 may respectively include one or more of the damper structures 130, 230, 330, 330', and 440 described with reference to FIGS. 1 to 12. For example, in an embodiment, the damper structures of the camera modules 100, 200, 300, and 400 may respectively include two or more of the damper structure 130 in FIG. 4, the damper structure 230 in FIG. 6, the damper structure 230' in FIG. 7, the damper structure 330 in FIG. 8, the damper structure 330' in FIG. 10, and the damper structure 430 in FIG. 12.

According to embodiments described herein, a camera module may provide high-quality OIS even when exposed to high-frequency external disturbances.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
 a housing;
 a first dynamic component movably disposed in the housing in a direction of an optical axis;
 a second dynamic component, including a lens, and movably disposed on the first dynamic component in a direction orthogonal to the optical axis;
 a pocket configured in either one or both of the first dynamic component and the second dynamic component;
 a damping gel disposed in the pocket; and
 a damping pin extending from the first dynamic component or the second dynamic component, and at least partially embedded in the damping gel,
 wherein the second dynamic component includes an injection body and an insert member at least partially embedded in the injection body, and the damping pin extends from the insert member toward the pocket.

2. The camera module of claim 1, wherein the pocket is defined by one or more surfaces of the first dynamic component, and the damping pin extends from the second dynamic component such that the damping pin is at least partially embedded in the damping gel.

3. The camera module of claim 1, wherein the pocket is defined by one or more surfaces of the second dynamic component, and the damping pin extends from the first dynamic component and is at least partially embedded in the damping gel.

4. The camera module of claim 3, wherein the first dynamic component includes a carrier configured to accommodate the second dynamic component, and a cover disposed over the second dynamic component and configured to prevent the second dynamic component from being separated from the carrier.

5. The camera module of claim 4, further comprising:
a damper coupled to the cover and having a portion protruding to a region above the cover,
wherein the damping pin extends from the damper to the pocket.

6. The camera module of claim 4, wherein the cover defines an incident hole corresponding to an optical axis, and the damping pin is configured to extend from an edge surrounding the incident hole of the cover to the pocket.

7. The camera module of claim 1, further comprising:
a driving assembly configured to move the first dynamic component in the direction of the optical axis with respect to the housing.

8. The camera module of claim 7, wherein the driving assembly includes:
a magnet coupled to one of the first dynamic component and the housing; and
a coil coupled to the other of the first dynamic component and the housing.

9. The camera module of claim 7, wherein the driving assembly includes a ball member disposed between the first dynamic component and the housing.

10. The camera module of claim 1, further comprising:
a driving assembly configured to move the second dynamic component in the direction orthogonal to the optical axis with respect to the first dynamic component.

11. The camera module of claim 10, wherein the driving assembly includes:
a magnet coupled to one of the second dynamic component and the housing; and
a coil coupled to the other of the second dynamic component and the housing.

12. The camera module of claim 10, wherein the driving assembly includes a ball guide disposed between the first dynamic component and the second dynamic component, a ball member disposed between the ball guide and the first dynamic component, and another ball member disposed between the ball guide and the first dynamic component.

13. The camera module of claim 12, wherein the ball guide is configured in a form of a quadrangular frame, and includes a cut portion recessed inwardly from an outer edge of the ball guide and accommodating at least a portion of the damping pin.

14. The camera module of claim 12,
wherein the ball guide is configured in an L-shape such that the ball guide allows a portion of the second dynamic component to directly oppose the first dynamic component in the direction of the optical axis, and
wherein the damping pin or the pocket is formed in the portion of the second dynamic component.

15. The camera module of claim 1, wherein the damping gel includes a viscoelastic material.

16. A camera module, comprising:
a housing;
a lens barrel disposed in the housing and including a lens;
a lens holder disposed in the housing and fixed to the lens barrel;
a carrier disposed in the housing and accommodating the lens holder;
a ball guide disposed between the carrier and the lens holder in an optical axis direction;
a damping gel disposed in a pocket of the carrier; and
a damper mounted in the lens holder and extending into the damping gel,
wherein the carrier is configured to move together with the lens holder in the optical axis direction, with respect to the housing,
wherein the lens holder is configured to move in a direction orthogonal to the optical axis direction, with respect to the housing, and
wherein the lens holder includes an injection body and an insert member at least partially embedded in the injection body, and the damper extends from the insert member toward the pocket.

17. The camera module of claim 16, wherein the damper includes a pin immersed in the damping gel.

18. A camera module, comprising:
a housing;
a lens barrel disposed in the housing and including a lens;
a lens holder disposed in the housing and fixed to the lens barrel;
a carrier disposed in the housing and accommodating the lens holder;
a ball guide disposed between the carrier and the lens holder in an optical axis direction;
a cover coupled to the carrier and disposed over the lens holder;
a damping gel disposed in a pocket of the lens holder; and
a damper mounted on the cover and extending into the damping gel,
wherein the carrier is configured to move together with the lens holder in the optical axis direction, with respect to the housing,
wherein the lens holder is configured to move in a direction orthogonal to the optical axis direction, with respect to the housing, and
wherein the lens holder includes an injection body and an insert member at least partially embedded in the injection body, and the damper extends from the insert member toward the pocket.

19. The camera module of claim 18, wherein the ball guide includes a quadrangular frame having a cut portion recessed inwardly from an outer edge of the quadrangular frame and accommodating at least a portion of the damper.

20. The camera module of claim 19, wherein the damper includes a pin immersed in the damping gel.

21. The camera module of claim 18, wherein the damper does not interfere with the ball guide.

* * * * *